Patented June 8, 1965

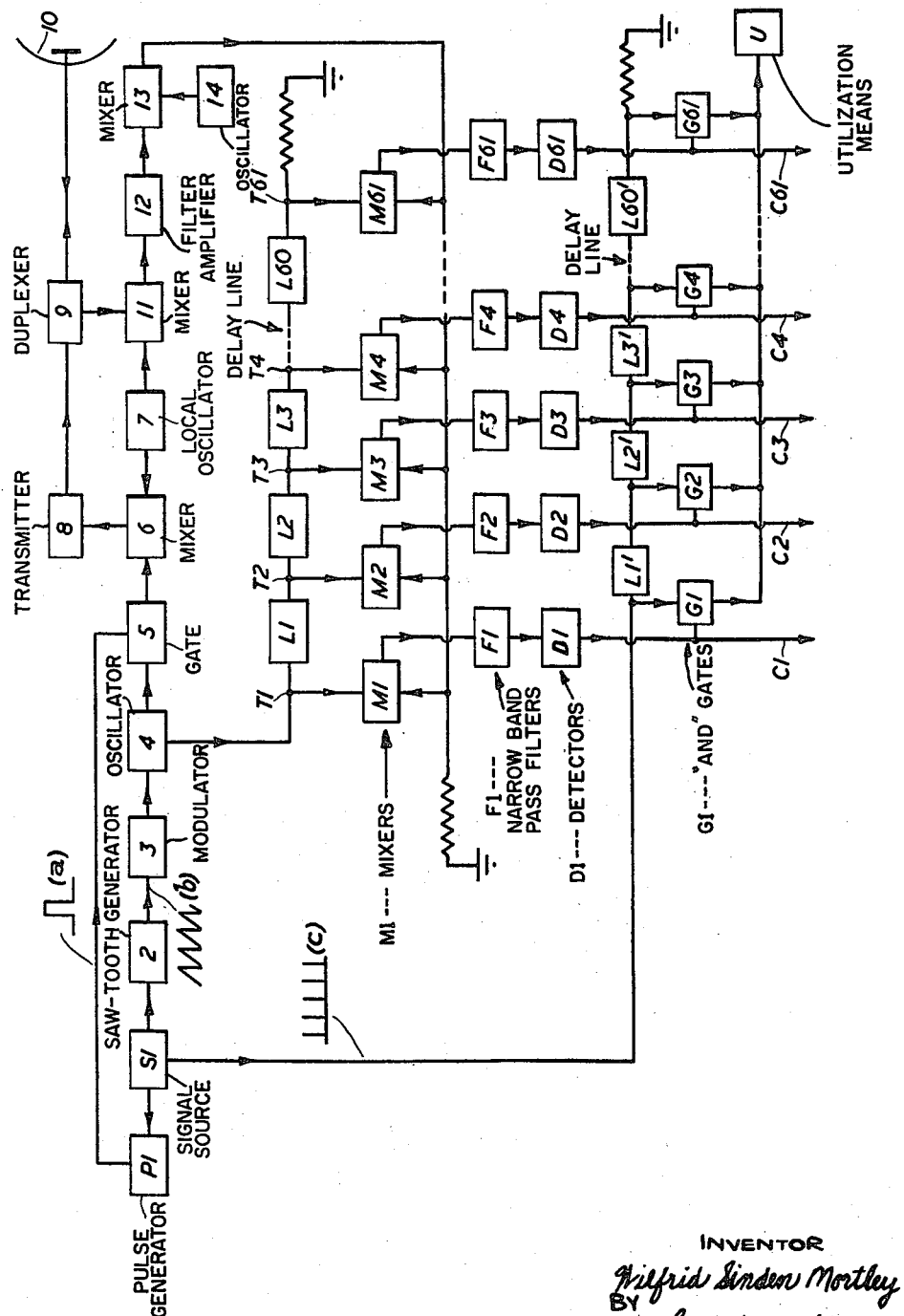

3,188,637
FM PULSED RADAR WITH INTRAPULSE RANGE
DISCRIMINATION
Wilfrid Sinden Mortley, Great Baddow, England, assignor to The Marconi Company Limited, a company of Great Britain
Filed July 5, 1960, Ser. No. 40,956
Claims priority, application Great Britain, July 7, 1959, 23,211/59
9 Claims. (Cl. 343—17.2)

This invention relates to pulsed radar systems.

In high power pulsed radar systems the transmitted pulses have necessarily to be made of relatively long length since obviously, other things being equal, the energy transmitted is a function of the pulse length. As is well known one of the defects of using a long pulse length in an ordinary pulsed radar system of the kind in which target range is determined merely by measuring the propogation time interval between transmission of a pulse and reception of the corresponding echo pulse is that, since the length of the pulse itself corresponds to a definite amount of range, the longer the pulse length the larger is this corresponding amount of range and the less therefore is the range discrimination of the radar system. In order to overcome this difficulty it is necessary to distinguish between target echoes whose differences of range are within the range amount corresponding to one pulse length. To do this involves distinguishing between echoes corresponding to different parts of the same pulse. Various attempts so to distinguish have been made—e.g. by reversing the phase transmitted during the pulse according to a predetermined code of phase reversals—but, so far as the present applicant is aware, previous proposals to distinguish between echoes of different parts of the same pulse have offered the disadvantages of excessive complexity and/or great technical and practical difficulties.

The present invention seeks to provide improved pulsed radar systems which, though employing relatively long transmitted pulses and being, therefore, capable of transmitting high powers, will, nevertheless, provide range discrimination of the order of that obtainable from an ordinary pulsed radar system using a much shorter pulse. As will be seen later, the invention achieves this object without requiring the use of a multiplicity of receivers, or a multiplicity of delay lines, or dispersive networks of precise predetermined laws.

In accordance with the present invention, a pulsed radar system comprises means for transmitting pulses of frequency modulated waves, means for receiving reflected echo pulses of said waves, a source of signals frequency modulated in correspondence with said transmitted waves, means for deriving from said received reflected echo pulses signals frequency modulated in correspondence therewith, means for mixing signals from said source with said derived signals, means for selecting from the resultant of said mixing signals occupying a predetermined bandwidth which is narrow relative to the bandwidth of the received reflected echo pulses, and means for utilising the selected signals for range indication. As will be seen there is thus obtained good utilisation of the reflected energy and if, as is preferred and as will be the normal practice of the invention, a suitable number of narrow bandwidth signals is provided, i.e. a number such that the total bandwidth corresponding to all of them together equals the whole bandwidth of the derived signals, and all of the signals selected from the resultant of mixing are employed, there will be full utilisation of the received reflected energy.

According to a feature of this invention, a pulsed radar system comprises means for transmitting pulses of frequency modulated waves, means for receiving reflected echo pulses of said waves, means for providing a first set of signals frequency modulated in correspondence with said transmitted waves, means for deriving from the received reflected echo pulses a second set of frequency modulated signals, means for providing from one of said sets of signals a plurality of relatively delayed replicas thereof, means for separately mixing the signals of the other set with said relatively delayed replicas, means for selecting from the output of said mixing means signals occupying a predetermined bandwidth which is narrow relative to the bandwidth of the received reflected echo pulses, and means for utilising the selected signals for range indication.

Preferably the frequency modulation is such that the frequency variation during each transmitted pulse is always in the same direction, i.e. increasing throughout the pulse or decreasing throughout the pulse. As will be apparent later, however, this, though preferred, is not essential, for it is possible, in carrying out the invention, to effect frequency modulation in such manner that, during each pulse, the frequency first rises (or falls) over a fraction of the pulse length (say about half) and then falls (or rises) over the remainder of the pulse length.

In one way of carrying out the invention a radar system comprises a source of pulses of predetermined length and predetermined pulse repetition frequency; a signal source of higher predetermined frequency locked with said pulse source; a variable frequency wave source; means controlled by said signal source for cyclically varying the frequency of said wave source in accordance with a predetermined law of variation to vary the wave frequency in the same direction and between predetermined limits in response to each signal from said signal source; means controlled by said pulse source for transmitting, during each pulse therefrom, a radio pulse of predetermined length each consisting of a similar band of frequencies derived from said wave source during one cycle of variation; means for deriving from received echo signals a modulated band of frequencies of width corresponding to the frequency bandwidth of the transmitted pulse; a delay line of length equal to the aforesaid signal source period and having a plurality of terminals each separated from the next by a portion of line having a delay equal to a fraction of said period, a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with output from a different mixer, the band pass width of each filter being approximately equal to the quotient of the width of the transmitted frequency band divided by the number of filters and each centered on the common beat frequency output from the mixers; means for separately detecting the outputs of the filters; and means for combining the detected outputs for utilisation.

Preferably the mixer input which is derived from said modulated band is fed directly thereto and the input from the wave source is fed to one end of the delay line and taken to the different mixers from different terminals thereof. Preferably the signals from the signal source are applied to control a saw-tooth generator adapted to produce a saw-tooth excursion in response to each of said signals; the wave source is controlled in frequency by a reactance valve in turn controlled by the saw-tooth excursions; and pulses from the pulse source are applied to open, during each pulse, a gate circuit in a channel between the wave source and the transmitter. Preferably also each sloping flank of the saw-tooth excursion is a little longer in time than the length of each pulse from the pulse source and overlaps the pulse at both ends.

Preferably again the received echo signals are shifted in frequency by a high frequency oscillator by such an amount that the whole derived modulated band of frequencies directly applied to the mixers is well to one side of the band of frequencies derived from the wave source and applied to the mixers.

In a preferred way of utilising the separated detected narrow band width signals, each of the separated detected narrow band signals is fed to a different gate circuit connected to be gated to the open condition by gating signals of the frequency of the aforesaid signal source and applied to the successive gates with delays which inter se are equal to the delays provided by successive portions of the delay line, all said gate circuits having their outputs fed to a common utilisation channel. The relatively delayed gating signals may be arranged to be generated by the aforesaid signal source itself or there may be provided a second delay line having delays like those of the first delay line and with signals from the signal source applied at one end, the required relatively delayed gating signals being taken from points along said second delay line.

The invention is illustrated in the accompanying drawing which is a block diagram of one embodiment of the invention. In describing the drawing certain frequencies will be given, but it is to be understood that these are purely by way of example and in no sense limiting.

Referring to the drawing, P1 is a pulse generator producing rectangular pulses as represented at (a) at a desired pulse repetition frequency which, in the present example, is 250 pulses per second. The pulses from the generator P1 are locked by the signals from a signal source S1 having a frequency of, for example $8 \times 10^4$ pulses per second. The signals from the source S1 trigger or otherwise control a saw-tooth generator 2 of the same frequency, i.e. producing $8 \times 10^4$ saw-teeth per second. The saw-teeth excursions are represented at (b) and the signals from S1 at (c). The length of each pulse (a) is 10 $\mu$sec. and it will be seen that with the tooth frequency just given the length of each tooth will be 12½ $\mu$sec. and is such that each tooth overlaps the pulse at both ends. The saw-tooth output from the generator 2 is used to control a reactance valve or modulator 3 in known manner to vary the frequency of a high frequency oscillator 4. This oscillator has, in the present example, a frequency range of 69.5 to 75.5 mc./s. and is varied in frequency over this range from the lower limit to the upper limit by each saw-tooth sloping flank. Varying frequency output from the oscillator 4 is fed through a gate 5 to a mixer 6. The gate 5 is opened by the pulses (a) from the generator P1. The whole arrangement is such that the middle of each period of opening of the gate 5 corresponds to the middle of the sloping flank of a saw-tooth. Since the length of each sloping flank is, as already stated, a little more than the length of each pulse (a) the waves passed by the gate 5 will vary in frequency over a range corresponding to the greater part of, but not the whole of, a saw-tooth sloping flank so that there is no risk of the signals passed by the gate 5 varying sharply in frequency due to either end of a tooth flank being reached while the gate is open.

The second input to the mixer 6 is taken from a so-called "STALO" 7, i.e. a stabilised local oscillator, and the resultant of mixing is fed to a transmitter 8 which transmits the pulses via a known duplexer 9 to a transmitting aerial 10 which, in the example illustrated, is used also for reception. To quote a practical figure, during each of the 10 $\mu$sec. pulses transmitted from the aerial 10 the transmitted frequency may rise during the pulse by 5 mc./s. It will be noted that the width of the frequency range of the oscillator 4 was above given as 6 mc./s.

Received echo signals from the aerial 10 are fed through the duplexer 9 to a mixer 11 whose second input is also taken from the oscillator 7. This mixer feeds into a filter amplifier 12 having a band pass of 70 to 75 mc./s. Output from the filter-amplifier 12 is fed to a second mixer 13 whose second input is provided by an oscillator 14 of, for example, 10 mc./s.

Output from the oscillator 4 is also fed to one end of a delay line capable of handling a frequency range of about 69 to 75 mc./s. with small dispersion and consisting of a number of identical portions L1, L2, L3 . . . L60 in series. The number of portions depends on the closeness of range discrimination required. In the example now being given it is assumed that there are 60 portions, each of equal delay length. The overall delay provided by the line is equal to the saw tooth repetition period of 12½ $\mu$sec. The delay line has terminals T1, T2, T3, T4 . . . T61, each successive pair of which are separated in time by the delay of one portion of the line whereby there appear at terminals T1, T2, T3, T4 . . . T61 relatively delayed replicas of the signals from oscillator 4.

The output from the mixer 13 consisting of a band of frequencies of 60 to 65 mc./s., is fed directly to mixers M1, M2, M3, M4 . . . M61, each of which receives its second input from the oscillator 4 via a different terminal T1, T2 . . . T61 on the delay line. The signals from the filter-amplifier 12 are changed in frequency by the mixer-oscillator combination 13–14 in order to ensure that the output frequency from the mixers M1, M2 . . . M61 shall not reach or approach zero but shall always be of a convenient relatively high value—in the present example around 10 mc./s.

Each mixer M1, M2 . . . M61 feeds into its own narrow band pass filter F1, F2 . . . F61 all of which are identical. Each has a band pass of 9.95 to 10.05 mc./s. It will now be apparent that at the time of occurrence of an echo pulse the output from one of the filters F1, F2 . . . F61 will be a narrow band of signals occuring for the duration of the transmitted pulse while the range of the target giving rise to the echo pulse may be determined by ascertaining which of the filters F1, F2 . . . F61 is at that time providing the aforesaid output. The outputs from the filters F1, F2 . . . F61 are separately detected by detectors D1, D2 . . . D61 and utilised in any convenient way. For example, they may be fed over connections C1, C2 . . . C61 to any convenient form of computer or other utilisation means able to make use of the signals to give target range information. The present invention is not concerned with such computer or like means actuated by the signals on the separate connections C1, C2 . . . C61 and therefore the computer or like means are not illustrated.

It will be seen that the signals on the connections C1, C2 . . . C61 will be signals providing a target range discrimination much better than that ordinarily appropriate to a 10 $\mu$sec. transmitted pulse. Theoretically the range discrimination will be that appropriate to a transmitted pulse only 0.2 $\mu$sec. (approximately) long, i.e. range discrimination of about 100 ft. In practice, however, it is not expected to achieve the theoretical range discrimination mainly because of unavoidable imperfections in the delay line which is theoretically required to have a very low dispersion over the whole band width which it handles. In practice, the delay line may take any of a variety of different forms, but it is proposed to constitute it by lengths of polythene cable each of which will, in the present example, be about 131 ft. long. The attenuation of such a cable-delay line is high and therefore amplifiers (not shown) will ordinarily be required between its portions. However, although for practical reasons, the theoretically possible range discrimination is not expected to be achieved, the improvement in range discrimination over an ordinary known radar system of the same transmitted pulse length is very great.

The outputs from the detectors may be used to operate an ordinary P.P.I. or other display tube and the drawing shows one arrangement enabling this to be done. The apparatus for this purpose includes a second delay line which provides the same delay as the delay line already mentioned and consists of the same number of equal portions $L1', L2', L3' \ldots L60'$. There is also a plurality of so-called "and" gates $G1, G2 \ldots G60$ one for each portion of the second delay line. To one end of the second delay line are applied gating signals constituted by signals (of frequency $8 \times 10^4$ per sec.) from the signal source S1. These gating signals pass down the second delay line and are taken from different terminals thereof to different gates $G1, G2 \ldots G60$, each of which receives signals to be gated from a different detector $D1, D2 \ldots D61$. The gated outputs from the gates G1 to G60 are combined in a single output connection which supplies signals to any convenient ordinary utilisation means U, such, for example, as a display means including a P.P.I. display tube.

Although in the illustrated embodiment the output from the mixer 13 is fed directly to the mixers M1 to M61 and the output from the oscillator 4 is fed to the said mixers via different terminals on the first delay line, the converse arrangement is obviously possible, i.e. the output from the oscillator 4 could be fed directly to these mixers and the output from the mixer 13 fed to them via the delay line terminals. However the illustrated arrangement is preferred, especially when the invention is applied to those radar systems in which there are a plurality of receiver channels, e.g. systems in which a plurality of receiving aerials together cover a whole area with each aerial "looking" at a different part of that area. When the present invention is applied to such a system and the oscillations from the oscillator 4 are fed to the mixers via the first delay line terminals, it is possible, as will be at once apparent, to make this single delay line common to all the receiver channels.

It will be apparent that the invention involves a considerable increase in numbers of components, mainly because of the provision of the multiplicity of mixers M1 to M61, filters F1 to F61 and detectors D1 to D61. However, since all the mixers M1 to M61 are identical, as also are all the filters F1 to F61, and all the detectors D1 to D61, the added complexity and technical difficulties are not excessively serious since the additional units required are essentially simple. In fact, the only additional pieces of apparatus which are admittedly difficult to design to be satisfactory are the delay lines, but the technical difficulties involved are quite small having regard to the results achieved. No phase reversals during the transmitted pulse are involved; there is no necessity to provide a large number of wide band delay lines; there are no dispersive networks of precise predetermined laws; and there is no requirement of a multiplicity of more or less complete receivers.

Obviously echoes from moving targets will introduce Doppler shifts as between the transmitted (modulated) frequencies and the received frequencies. In the preceding description such Doppler frequency shifts have been ignored. In practice, given proper design—e.g. with frequency values like those exemplified hereinbefore—the largest Doppler shifts ordinarily to be expected will not be large enough adversely to affect the working of the system to any practical extent and can in fact be ignored.

In the illustrated embodiment there are two delay lines L1 to L60 and L1' to L60'. It is possible to combine the functions of these two lines by means of a single line, because, owing to frequency differences, it is possible to feed signals from units S1 and 4 into the same line by means of a combining filter and to separate the two sorts of output, one for the mixers M1 to M61 and the other for opening the gates G1 to G60.

It is also not necessary to produce the relatively delayed gating signals for the gates G1 to G60 by means of a delay line at all since such signals can, if desired, be directly generated by signal generating apparatus included in the unit S1. They could also be produced by providing, connected to each of the terminals T1 to T61 a frequency discriminator adapted to translate the received modulation frequency band into a saw-tooth of rising (or falling) amplitude thus producing a series of similar saw-teeth (one from each terminal) delayed with respect to one another. Each of these saw-teeth would be converted by differentiation into a simple pulse and the pulse would be used to open the gates G1 to G60.

I claim:

1. A pulsed radar system comprising a source of pulses of predetermined length and predetermined pulse repetition frequency; a signal source of higher predetermined frequency locked with said pulse source; a variable frequency wave source; means controlled by said signal source for cyclically varying the frequency of said wave source in accordance with a predetermined law of variation to vary the wave frequency in the same direction and between predetermined limits in response to each signal from said signal source; means controlled by said pulse source for transmitting, during each pulse therefrom, a radio pulse of predetermined length each consisting of a similar band of frequencies derived from said wave source during one cycle of variation; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with output from a different mixer, the band pass width of each filter being approximately equal to the quotient of the width of the transmitted frequency band divided by the number of filters and each centered on the common beat frequency output from the mixers; means for separately detecting the outputs of the filters; and means for combining the detected outputs for utilization.

2. A pulsed radar system comprising a source of pulses of predetermined length and predetermined pulse repetition frequency; a signal source of higher predetermined frequency locked with said pulse source; a variable frequency wave source; means controlled by said signal source for cyclically varying the frequency of said wave source in accordance with a predetermined law of variation to vary the wave frequency in the same direction and between predetermined limits in response to each signal from said signal source; means controlled by said pulse source for transmitting, during each pulse therefrom, a radio pulse of predetermined length each consisting of a similar band of frequencies derived from said wave source during one cycle of variation; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said modulated band and the other from said wave source; means for feeding the input derived from said modulated band directly to the mixers; means for connecting the variable frequency wave source to one end of the delay line; means for feeding the other input to each respective mixer via a different terminal on said delay line so that said other inputs of the different mixers are delayed by amounts differing from one another by the delay of one portion of said delay line; a plurality of narrow band filters each having substantially the same band pass and each fed with the output from a different mixer, the band pass width of each filter being approximately equal to the quotient of the width of the transmitted frequency band divided by the number of filters and each centered on the common beat frequency output from the mixers; means for separately detecting the outputs of the filters; and means for combining the detected outputs for utilization.

3. A pulsed radar system comprising a source of pulses of predetermined length and predetermined pulse repetition frequency; a signal source of higher predetermined frequency locked with said pulse source; a variable frequency wave source; a saw-tooth generator connected to said signal source for producing a saw-tooth excursion in response to each signal from the signal source; reactance valve means controlled by the saw-tooth excursions for cyclically varying the frequency of said wave source in accordance with a predetermined law of variation to vary the wave frequency in the same direction and between predetermined limits in response to each signal from said signal source; means controlled by said pulse source for transmitting, during each pulse from the pulse source, a radio pulse of predetermined length each consisting of a similar band of frequencies derived from said wave source during one cycle of variation, said transmitting means including a transmitter, a gate circuit connected between the wave source and the transmitter, and means for applying the pulses from said pulse source to said gate circuit to open it during each pulse; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with the output from a different mixer, the band pass width of each filter being approximately equal to the quotient of the width of the transmitted frequency band divided by the number of filters and each centered on the common beat frequency output from the mixers; means for separately detecting the outputs of the filters; and means for combining the detected outputs for utilization.

4. A pulsed radar system comprising a source of pulses of predetermined length and predetermined pulse repetition frequency; a signal source of higher predetermined frequency locked with said pulse source; a variable frequency wave source; a saw-tooth generator connected to said signal source for producing a saw-tooth excursion in response to each signal from the signal source, each of the saw-tooth excursions having a sloping flank which is a little longer in time than the length of each pulse from the pulse source and overlaps the pulse at both ends; reactance valve means controlled by the saw-tooth excursions for cyclically varying the frequency of said wave source in accordance with a predetermined law of variation to vary the wave frequency in the same direction and between predetermined limits in response to each signal from said signal source; means controlled by said pulse source for transmitting, during each pulse from the pulse source, a radio pulse of predetermined length each consisting of a similar band of frequencies derived from said wave source during one cycle of variation, said transmitting means including a transmitter, a gate circuit connected between the wave source and the transmitter, and means for applying the pulses from said pulse source to said gate circuit to open it during each pulse; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with the output from a different mixer, the band pass width of each filter being approximately equal to the quotient of the width of the transmitted frequency band divided by the number of filters and each centered on the common beat frequency output from the mixers; means for separately detecting the outputs of the filters; and means for combining the detected outputs for utilization.

5. A pulsed radar system comprising a source of pulses of predetermined length and predetermined pulse repetition frequency; a signal source of higher predetermined frequency locked with said pulse source; a variable frequency wave source; means controlled by said signal source for cyclically varying the frequency of said wave source in accordance with a predetermined law of variation to vary the wave frequency in the same direction and between predetermined limits in response to each signal from said signal source; means controlled by said pulse source for transmitting, during each pulse therefrom, a radio pulse of predetermined length each consisting of a similar band of frequencies derived from said wave source during one cycle of variation; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; means, including a high frequency oscillator, for shifting the received echo signals in frequency by such an amount that the whole derived modulated band of frequencies applied to the mixers is well to one side of the band of frequencies derived from the wave source and applied to said mixers; a plurality of narrow band filters each having substantially the same band pass and each fed with the output from a different mixer; the band pass width of each filter being approximately equal to the quotient of the width of the transmitted frequency band divided by the number of filters and each centered on the common beat frequency output from the mixers; means for separately detecting the outputs of the filters; and means for combining the detected outputs for utilization.

6. A pulsed radar system comprising a source of pulses of predetermined length and predetermined pulse repetition frequency; a signal source of higher predetermined frequency locked with said pulse source; a variable frequency wave source; means controlled by said signal source for cyclically varying the frequency of said wave source in accordance with a predetermined law of variation to vary the wave frequency in the same direction and between predetermined limits in response to each signal from said signal source; means controlled by said pulse source for transmitting, during each pulse therefrom a radio pulse of predetermined length each consisting of a similar band of frequencies derived from said wave source during one cycle of variation; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with the output from a different mixer, the band pass width of each filter being approximately equal to the quotient of the width of the transmitted frequency band divided by the number of filters and each centered on the common beat frequency output from the mixers; means for separately detecting the outputs of the filters; a plurality of gate circuits, one for each of said filters, connected to be gated to their open condition by relatively delayed gating signals of the frequency of said signal source, the gating signals being applied to the successive gate circuits with delays which inter se are equal to the delays provided by successive portions of the delay line; means for feeding each of the separated detected filter outputs to a different one of said gate circuits; and means for combining the outputs of all of said gate circuits in a common utilization channel.

7. A pulsed radar system comprising a source of pulses of predetermined length and predetermined pulse repetition frequency; a signal source of higher predetermined frequency locked with said pulse source; a variable frequency wave source; means controlled by said signal source for cyclically varying the frequency of said wave source in accordance with a predetermined law of variation to vary the wave frequency in the same direction and between predetermined limits in response to each signal from said signal source; means controlled by said pulse source for transmitting, during each pulse therefrom a radio pulse of predetermined length each consisting of a similar band of frequencies derived from said wave source during one cycle of variation; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with the output from a different mixer, the band pass width of each filter being approximately equal to the quotient of the width of the transmitted frequency band divided by the number of filters and each centered on the common beat frequency output from the mixers; means for separately detecting the outputs of the filters; a plurality of gate circuits, one for each of said filters, connected to be gated to their open condition by relatively delayed gating signals generated by said signal source, the gating signals being applied to the successive gate circuits with delays which inter se are equal to the delays provided by successive portions of the delay line; means for feeding each of the separated detected filter outputs to a different one of said gate circuits; and means for combining the outputs of all of said gate circuits in a common utilization channel.

8. A pulsed radar system comprising a source of pulses of predetermined length and predetermined pulse repetition frequency; a signal source of higher predetermined frequency locked with said pulse source; a variable frequency wave source; means controlled by said signal source for cyclically varying the frequency of said wave source in accordance with a predetermined law of variation to vary the wave frequency in the same direction and between predetermined limits in response to each signal from said signal source; means controlled by said pulse source for transmitting, during each pulse therefrom a radio pulse of predetermined length each consisting of a similar band of frequencies derived from said wave source during one cycle of variation; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with the output from a different mixer, the band pass width of each filter being approximately equal to the quotient of the width of the transmitted frequency band divided by the number of filters and each centered on the common beat frequency output from the mixers; means for separately detecting the outputs of the filters; a plurality of gate circuits, one for each of said filters, connected to be gated to their open condition by relatively delayed gating signals; a second delay line having a plurality of terminals each separated from the next by delays which are like those of the first-mentioned delay line; means for applying signals from said signal source to one end of said second delay line, the required relatively delayed gating signals being taken from the different terminals of said second delay line and applied to the successive gate circuits; means for feeding each of the separated detected filter outputs to a different one of said gate circuits; and means for combining the outputs of all of said gate circuits in a common utilization channel.

9. A pulsed radar system comprising a signal source of predetermined frequency; a variable frequency wave source; means controlled by said signal source for cyclically varying the frequency of said wave source in accordance with a predetermined law of variation to vary the wave frequency in response to each signal from said signal source; means for transmitting radio pulses of predetermined length, each radio pulse consisting of a similar band of frequencies derived from said wave source during one cycle of variation; means for deriving from received echo signals a modulated band of frequencies of width corresponding to the frequency band width of the transmitted pulse; a delay line of length equal to the aforesaid signal source period and having a plurality of terminals each separated from the next by a portion of line having a delay equal to a fraction of said period; a plurality of mixers each connected to mix two inputs derived one from said wave source and one from said modulated band, one of the two inputs to each mixer being fed directly thereto and the other being fed thereto via a different terminal on said delay line whereby the said other inputs to the different mixers are delayed by amounts differing from one another by the delay of one portion of said delay line; a plurality of narrow band filters each having substantially the same band pass and each fed with the output from a different mixer, the band pass width of each filter being approximately equal to the quotient of the width of the transmitted frequency band divided by the number of filters and each centered on the common beat frequency output from the mixers; means for separately detecting the outputs of the filters; and means for combining the detected outputs for utilization.

References Cited by the Examiner

UNITED STATES PATENTS

| | | | |
|---|---|---|---|
| 2,525,328 | 10/50 | Wolff | 343—17.2 |
| 2,913,717 | 11/59 | Brandon et al. | 343—17.2 |

CHESTER L. JUSTUS, *Primary Examiner.*

FREDERICK M. STRADER, *Examiner.*